US010387541B2

(12) United States Patent
Hassan et al.

(10) Patent No.: US 10,387,541 B2
(45) Date of Patent: Aug. 20, 2019

(54) HIGH QUALITY SETTING OF TEXT FOR PRINT, WITH FULL CONTROL OVER LAYOUT, USING A WEB BROWSER

(71) Applicant: Hewlett-Packard Development Company, L.P., Spring, TX (US)

(72) Inventors: Tamir Hassan, Vienna (AT); Niranjan Damera Venkata, Chennai (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/545,110

(22) PCT Filed: May 21, 2015

(86) PCT No.: PCT/EP2015/061235
§ 371 (c)(1),
(2) Date: Jul. 20, 2017

(87) PCT Pub. No.: WO2016/119913
PCT Pub. Date: Aug. 4, 2016

(65) Prior Publication Data
US 2018/0004712 A1    Jan. 4, 2018

(30) Foreign Application Priority Data

Jan. 29, 2015   (IN) .............................. 429/CHE/2015

(51) Int. Cl.
*G06F 17/21*    (2006.01)
*G06F 17/22*    (2006.01)
*H04N 1/00*    (2006.01)

(52) U.S. Cl.
CPC .......... *G06F 17/212* (2013.01); *G06F 17/218* (2013.01); *G06F 17/2247* (2013.01);
(Continued)

(58) Field of Classification Search
None
See application file for complete search history.

(56) References Cited

U.S. PATENT DOCUMENTS 5,003,614 A *  3/1991  Tanaka .................... G06K 9/20
                                                     382/171
6,535,221 B1 *  3/2003  Allen ..................... G06T 3/403
                                                     345/611
(Continued)

FOREIGN PATENT DOCUMENTS

EP      1343095      9/2003

OTHER PUBLICATIONS

"Convert HTML to PDF".
(Continued)

*Primary Examiner* — Stephen S Hong
*Assistant Examiner* — Sanchita Roy
(74) *Attorney, Agent, or Firm* — Mannava & Kang

(57) ABSTRACT

Described herein are systems and methods for formatting text for generating a print document based on a web document. For example, in some examples, a subset of characters of a first element of a web document is wrapped in a second element. Further, the onscreen position of the subset is determined based on the wrapping. In addition, the position on a print document for the subset is determined based on the determined onscreen position.

9 Claims, 4 Drawing Sheets

(52) U.S. Cl.
CPC .......... *G06F 17/214* (2013.01); *H04N 1/0044* (2013.01); *H04N 1/00464* (2013.01)

(56) References Cited

U.S. PATENT DOCUMENTS

| | | |
|---|---|---|
| 8,454,588 B2 | 6/2013 | Morton et al. |
| 8,479,092 B1 | 7/2013 | Pandey |
| 2002/0035533 A1 | 3/2002 | Mache et al. |
| 2003/0014445 A1 | 1/2003 | Formanek |
| 2004/0023330 A1 | 2/2004 | Sode |
| 2004/0205568 A1* | 10/2004 | Breuel .................. G06F 17/211 715/205 |
| 2006/0146075 A1* | 7/2006 | Weiss ........................ G06T 3/40 345/660 |
| 2008/0002916 A1* | 1/2008 | Vincent ................ G06K 9/3258 382/305 |

OTHER PUBLICATIONS

Jaimin Vaja, "Generate PDF Files Using Pure Client-Side JavaScript with jsPDF", Sep. 8, 2012.

Xue Xueya et al, "The Research and Application of the Creation PDF Document Based on the iTextSharp", Jun. 3-5, 2012.

\* cited by examiner

HIGH QUALITY SETTING OF TEXT FOR PRINT, WITH FULL CONTROL OVER LAYOUT, USING A WEB BROWSER

BACKGROUND

Web documents, such as web pages, are designed to be rendered on computer screens. Web browsers are therefore specifically designed to render elements of a web document (e.g., text, images, etc.) for proper formatting and display on a computer screen. For example, a web browser may have a text rendering algorithm used to lay out text in a web document for display on a computer screen. The web browser may further have a print function that allows the web document to create a print document from the web document. Creation of such print documents may be useful for a user of a computing device to make a physical copy of the web document by printing the web document.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figures 1, 2:
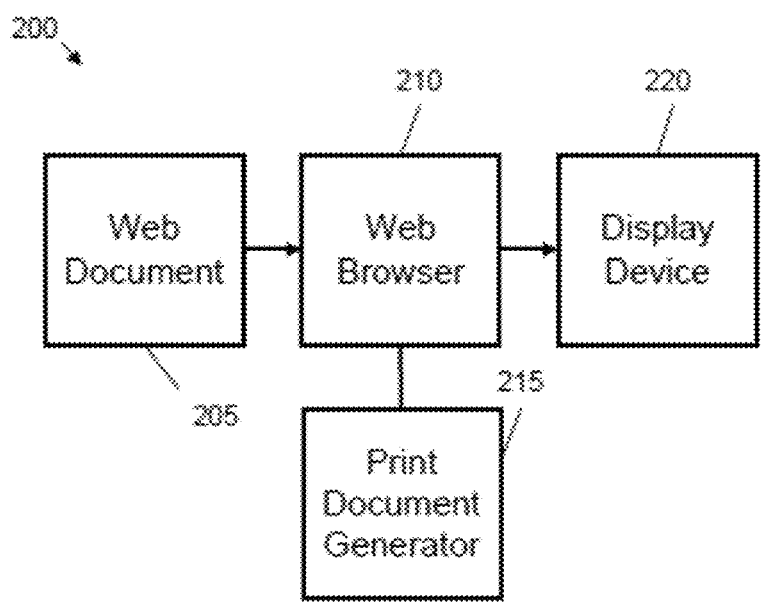
FIG. 1 shows an example of the uneven spacing caused by using onscreen rendering coordinates for a print document.
FIG. 2 shows an example of an apparatus for formatting text for generating a print document from a web document.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Certain examples described herein relate to systems and methods for formatting text. These examples may be used to generate print documents from web documents. More particularly, certain examples relate to systems and methods for wrapping a subset of characters (e.g., text such as a single character or word) of an element of a web document in another element in order to determine an onscreen position (also referred to as "onscreen coordinates") of the subset. The onscreen position of the subset can then be used to determine a position for the subset on a print document (also referred to as "print document coordinates").

In certain examples, additional systems and methods for formatting text are described herein. More particularly, certain examples relate to systems and methods for supersampling an attribute or multiple attributes (e.g., CSS attributes such as font size, line spacing, etc.) of elements (e.g., an element wrapping a subset as discussed herein), such as multiplying the attribute by a known scaling factor (e.g., 4) before determining the onscreen position of the text of the element. Further, the position of the text of the elements on a print document may be determined based on the onscreen position such as discussed herein and the position then scaled back down by the known scaling factor. Some such examples may be used in conjunction with methods of determining onscreen character position of characters of a web document (e.g., such as described herein with respect to FIG. 3 below). The methods and systems described herein might comprise a dedicated apparatus and/or be implemented as a computer program (e.g. a script in a programming language, a plugin in a web browser, a print driver, etc.) running on a computer, or other software and/or hardware.

When generating a document, whether it be a web document or a print document, the layout of the document is determined to ensure that text, images, or other objects in the document are presented in an orderly manner. Misalignment of such objects, such as columns of text, or other errors such as improper size or spacing of text can result in a poor experience for a user interacting with the document. Accordingly, it may be useful to ensure that a print document generated from a web document is laid out well and does not contain any such errors.

In order to lay out text in a print document correctly, certain examples herein take into account how much space the text will take on the page. It is further noted that comparative techniques for generating print documents from web documents often result in errors in the generated print documents as they do not adequately determine or account for how much space the text will take on the print document.

In particular, it is noted that, in a comparative case, when a web document is printed from a web browser, for example, the text setting for the print document generated is changed from the text setting the web browser uses to render the text onscreen on a computer display of a computing device running the web browser. This occurs even if the web document is associated with a cascading style sheet (CSS) that specifies that attributes such as formatting and column width are to remain the same when rendered, such as when rendered on a print document. Accordingly, in the print document, attributes such as position of line breaks, width of columns of text, height of columns of text, etc. can change from what was rendered onscreen.

In considering these comparative cases it is noted that variations in attributes in a print document generated from a web document may occur due to the widths of individual characters (and similarly words) not scaling linearly with respect to point size of the characters at the small pixel sizes that typically are used to render text onscreen. This may occur due to pixel rounding errors and font hinting, which is the optimization of character shapes for better rendering onscreen at low resolutions. Therefore, using character coordinates as determined by the web browser for onscreen rendering in order to generate a print document can lead to errors. For example, FIG. 1 shows an example of the uneven spacing caused by using onscreen rendering coordinates for a print document. In particular there is an excessive gap after the "w" characters and an overly tight fit between the "l" and "t" characters as pointed out by the arrows in FIG. 1. Thus, described herein are examples of systems and methods for generating print documents from web documents such that the layout of the print documents better match the onscreen layout of a web document as rendered by a web browser. For example, systems and methods for supersampling described herein may reduce such deviations as they may render text and a higher size, and therefore higher resolution. Though the systems and methods for supersampling described herein are applied with respect to browsers, they may also be applied to other pixel-based rendering devices.

FIG. 2 shows an example of an apparatus 200 for formatting text for generating a print document (e.g., Portable Document Format (PDF) file) from a web document (e.g., a HyperText Markup Language (HTML) document). The apparatus 200 receives a web document 205, such as in a web browser 210 running on the apparatus 200. The apparatus 200 may further have a print document generator 215 that runs on the apparatus 200 for generating print documents from the web document 205. In some examples, the print document generator 215 may be a plug-in that executes as part of the web browser 210. The web browser 210 may render the web document onscreen such as on a display device 220 (e.g., monitor, screen, etc.) of the apparatus 200. The print document generator 215 may determine the onscreen position for text in the web document as rendered by the web browser 210. The print document generator 215 may further determine the position on a print document for the text based on the determined onscreen position and generate a print document accordingly.

Figure 3:
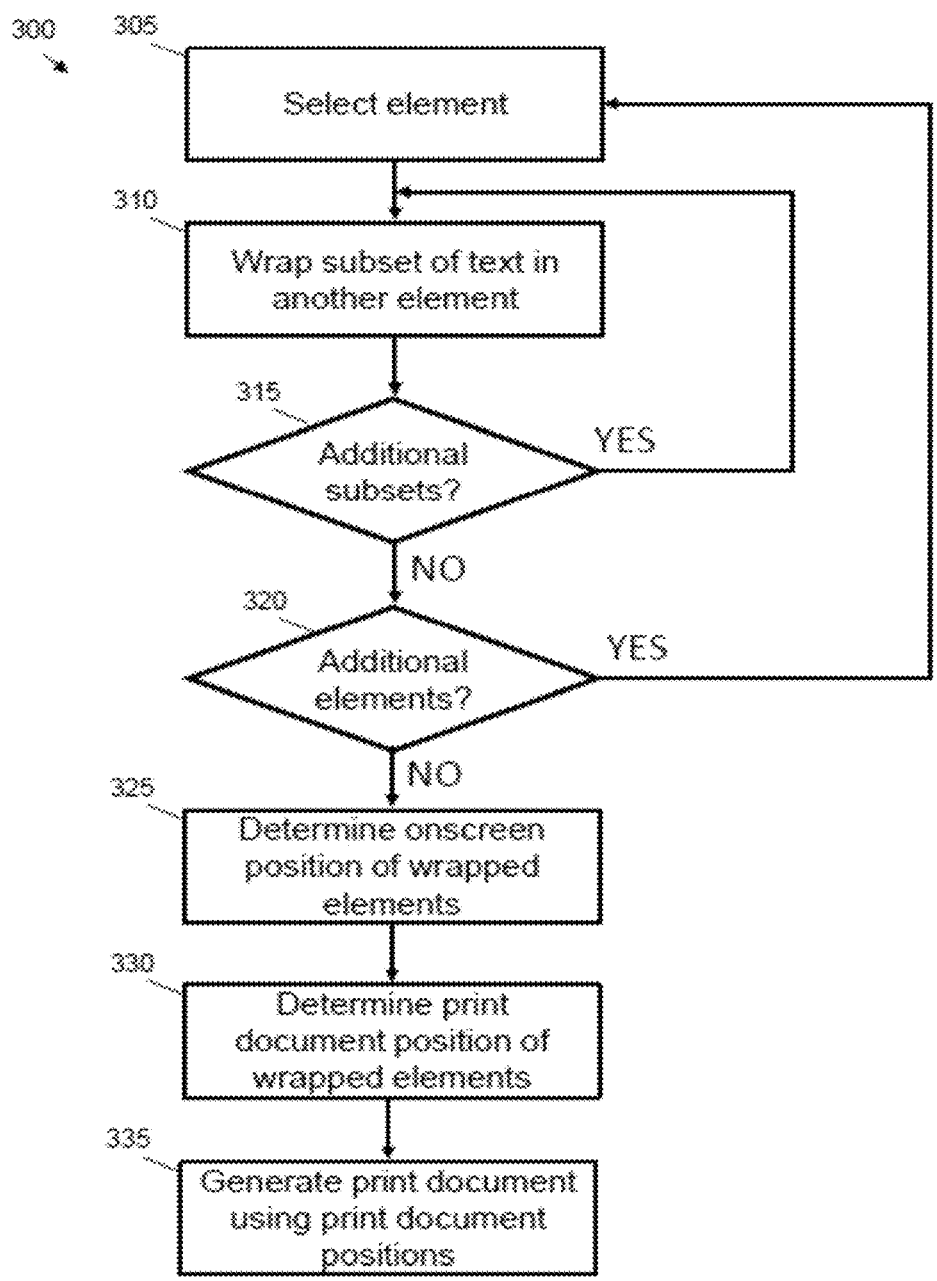
FIG. 3 shows an example of a method for formatting text for generating a print document from a web document.

FIG. 3 shows an example of a method 300 for formatting text for generating a print document (e.g., Portable Document Format (PDF) file) from a web document (e.g., HTML document). At a block 305, an element (e.g., an HTML element such as <p>) of a web document is selected to determine the character position of text in the element. At a block 310, a subset of characters (e.g., a single character or a word) of the selected element is wrapped in another element, such as a <span> element. At a block 315, it is determined if there are additional subsets of characters in the selected element for which character position is to be determined.

If at the block 315, there are additional subsets of characters in the selected element for which character position is to be determined, the method returns to the block 310 where a different subset of characters is wrapped. If at the block 315, there are no additional subsets of characters in the selected element for which character position is to be determined, the method proceeds to a block 320.

At the block 320, it is determined if there are additional elements of the web document for which to determine the character position of text in the element. If at the block 320, there are additional elements of the web document for which to determine the character position of text in the element, the method returns to the block 305 where a different element is selected. If at the block 320, there are no additional elements of the web document for which to determine the character position of text in the element, the method proceeds to a block 325.

At the block 325, the onscreen position is determined for each of the subsets wrapped in an element at block 310. For example, the onscreen position may be determined by calling a getBoundingClientRect( ) function on each element wrapping a subset, which then returns the onscreen coordinates of an element, such as the subset. For example, the coordinates may include a bounding rectangle for the element, including a starting x-coordinate "x1", an ending x-coordinate "x2", a starting y-coordinate "y1", an ending y-coordinate "y2".

Further, in some examples, determining the onscreen position of the subsets means determining the individual positions of each of the subsets onscreen as well as where line breaks occur in the web document. Determining where line breaks occur can be useful for text selection, accurate print preview rendering in HTML, etc. In some examples, where line breaks occur in the web document may be determined by comparing the y-coordinates of adjacent words in the text, where if the y-coordinates change between adjacent words, a new line has been encountered.

Further, in some examples, if hyphenation is turned on for the web document, for a hyphenated word, getBoundingClientRect( ) returns a rectangle with a height equal to the height of both lines including a portion of the hyphenated word, and a width equal to the entire paragraph (i.e., the width of a rectangle encompassing both portions of the hyphenated word). Therefore, in order to find the true onscreen coordinates of the hyphenated word, the position of the line break is taken into account as follows. The onscreen coordinates of the element before the hyphenated word is used in part to determine the onscreen coordinates of the hyphenated word. In particular, the x2 coordinate of the element before the hyphenated word is used as the x1 coordinate of the hyphenated word. Further, the point at which the word has broken to the next line is determined. For example, a list of valid breaking points (line break points) (e.g., at the end of syllables (the browser's hyphenation tool adds this information to the text stream)) is obtained. The largest (i.e., widest) portion of the hyphenated word, including the width of the hyphen, that fits on the line up to the valid breaking point (e.g., (coordinate of breaking point)-(x2 coordinate of element before the hyphenated word)) on that line is the portion of the hyphenated word that is rendered on the current line. The remainder of the hyphenated word is rendered on the next line.

Further, at a block 330, the onscreen position of each of the subsets is used to determine a position on a print document for each of the subsets. For example, the web browsers native rendering algorithms may be used to render the text of the subsets to be printed in an offscreen buffer. The offscreen buffer may have attributes (e.g., size, resolution, dimensions, margins, etc.) that are the same as the print document.

Continuing, at a block 335, the print document is generated with the subsets in the determined position on the print document. For example, a Portable Document Format (PDF) or other printable document format file of the print document may be generated, or the print document may be directly sent as data to a physical printer in an appropriate format for printing (e.g., using an appropriate print driver. For example, the offscreen buffer may be formatted and saved as the print document file or data from the offscreen buffer may be formatted and sent to the physical printer.

The results of method 300 may lead to an improvement over comparative techniques for generating a print document from a web document. However, in some cases, the results of method 300 may not always account for differences in relative character width between different characters used in the web document leading to suboptimal print document generation (e.g., see FIG. 1). Accordingly, supersampling may be used in conjunction with methods of determining onscreen character position of characters of a web document (e.g., such as described with respect to method 300).

Figure 4:
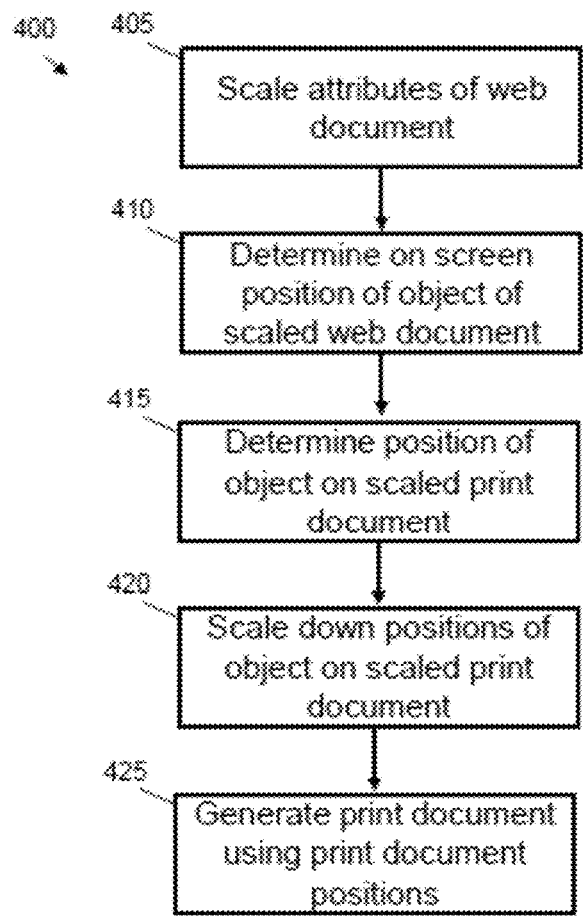
FIG. 4 shows an example of a method for formatting text for generating a print document from a web document using supersampling.

FIG. 4 shows an example of a method 400 for formatting text for generating a print document (e.g., PDF file) from a web document (e.g., HTML document) using supersampling. At a block 405, the attributes of the web document are multiplied by a known scaling factor to generate a scaled web document. At a block 410, the onscreen position of objects (e.g., subsets, text, characters, and/or words, etc.) of the scaled web document is determined. For example, the techniques discussed with respect to method 300 involving wrapping subsets in elements and calling the getBoundingClientRect( ) function may be used for the scaled web document.

Further, at a block 415, the onscreen position of each of the objects of the scaled web document is used to determine a position on a scaled print document (e.g., a desired print document format scaled up by the known scaling factor) for each of the objects. For example, the web browsers native rendering algorithms may be used to render the text of the objects to be printed in an offscreen buffer. The offscreen buffer may have attributes (e.g., size, resolution, dimensions, margins, etc.) that are the same as the scaled print document.

Continuing, at a block 420, the position on the scaled print document for each of the objects is scaled back down by dividing the position by the known scaling factor to generate the position on the desired print document for each of the objects. Further, at a block 425, the print document is generated with the objects in the determined position on the print document. For example, a Portable Document Format (PDF) or other printable document format file of the print document may be generated, or the print document may be directly sent as data to a physical printer in an appropriate format for printing (e.g., using an appropriate print driver. For example, the offscreen buffer may be formatted and saved as the print document file or data from the offscreen buffer may be formatted and sent to the physical printer.

It should be noted that though methods 300 and 400 are described with certain blocks in a certain order, other similar methods for formatting text may be used as would be understood by one of skill in the art. For example, it is not necessary that the subsets of characters be wrapped on an element by element basis, but rather subsets may be wrapped in any order.

Figure 5:
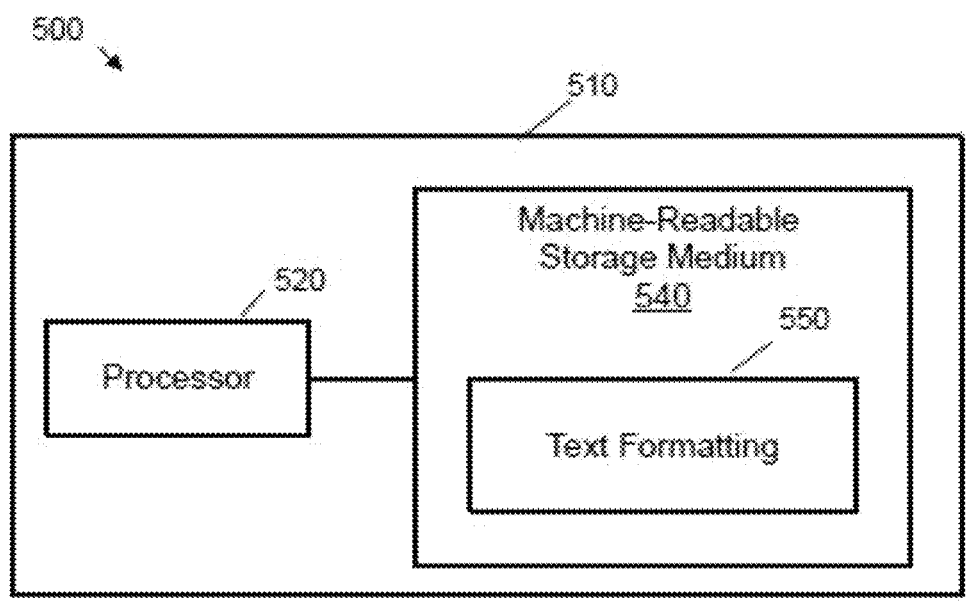
FIG. 5 is a schematic diagram showing a processing device according to an example.

Certain methods and systems as described herein may be implemented by a processor that processes computer program code that is retrieved from a non-transitory storage medium. FIG. 5 shows an example 500 of computing device 510 comprising a machine-readable storage medium 540 coupled to a processor 520. In certain case the computing device 510 may comprise a computer; in other cases the computing device may comprise a printer, scanner, display device or the like. Machine-readable media 540 can be any non-transitory media that can contain, store, or maintain programs and data for use by or in connection with an instruction execution system. Machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc. In FIG. 5, the machine-readable storage medium comprises program code to implement a text formatting 550 such as the methods of formatting text for generating a print document from a web document (e.g., the methods 300, 400, and the like). Similarly, it should be understood that the apparatus 200, method 300, or method 400 may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least an image filter as described above. In this regard, the described examples may be implemented at least in part by computer program code stored in (non-transitory) memory and executable by the processor, or by hardware, or by a combination of tangibly stored code and hardware (and tangibly stored firmware).

For example, in one case the computer-readable instructions, when executed by a processing system, cause the processing system to wrap a subset of characters of a first element of a web document in a second element. The computer-readable instructions, when executed by a processing system, further cause the processing system to determine an onscreen position of the subset based on the wrapping. The computer-readable instructions, when executed by a processing system, further cause the processing system to determine a position on a print document for the subset based on the determined onscreen position. In another case, the computer-readable instructions, when executed by a processing system, further cause the processing system determine an attribute of the subset and scale the attribute, wherein determining the position on the print document is further based on the scaling.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for formatting text, the method comprising:
 receiving a web document having a plurality of attributes, wherein the plurality of attributes comprises at least one of a font size and a line spacing;
 generating, by a processor, a scaled web document by:
  determining an attribute of a first subset of characters of a first element; and
  scaling up the attribute of the first subset by multiplying the attribute by a scaling factor that is greater than 1;
 determining an onscreen position of objects of the scaled web document by:
  wrapping the first subset of characters of the first element of the scaled web document in a second element, and
  determining an onscreen position of the first subset based on the wrapping;
 determining a position of the first subset on a scaled print document for each of the objects of the scaled web document based on the scaling up of the attribute of the first subset, and rendering a text of the objects to be printed in an buffer;
 generating a position on a desired print document for each of the objects of the scaled print document by scaling down each of the objects of the scaled print document in the buffer by the scaling factor; and
 formatting the desired print document for one of saving as a print document file and sending to a physical printer.

2. The method of claim 1, further comprising:
 determining the position of the first subset on the scaled print document based on the scaling down of the attribute of the first subset.

3. The method of claim 1, wherein the web document is in HyperText Markup Language, wherein the desired print document is in Portable Document Format and the method comprises outputting the desired print document.

4. The method of claim 1, further comprising:
 determining coordinates for a valid breaking point in the scaled web document; and
 determining a position of a second subset of characters of the first element based on the coordinates for the valid breaking point and the position of the second subset, wherein the second subset comprises a hyphenated word that directly follows the first subset in the scaled web document.

5. An apparatus for formatting text comprising:
a processor; and
a memory storing instructions that when executed cause the processor to:
receive a web document having a plurality of attributes, wherein the plurality of attributes comprises at least one of a font size and a line spacing;
generate a scaled web document by causing the processor to:
determine an attribute of a subset of characters of a first element, and
scale up the attribute of the subset by multiplying the attribute by a scaling factor that is greater than 1;
determine an onscreen position of objects of the scaled web document by causing the processor to:
wrap the subset of characters of the first element of the scaled web document in a second element, and
determine an onscreen position of the subset based on the wrapping;
determine a position of the subset on a scaled print document for each of the objects of the scaled web document based on the scaling up of the attribute of the subset, and render a text of the objects to be printed in an buffer;
generate a position on a desired print document for each of the objects of the scaled print document by scaling down each of the objects of the scaled print document in the buffer by the scaling factor; and
format the desired print document for one of saving as a print document file and sending to a physical printer.

6. The apparatus of claim 5, wherein the instructions are executable to cause the processor to determine the position of the subset on the scaled print document based on the scaling down of the attribute of the subset.

7. The apparatus of claim 5, wherein the web document is in HyperText Markup Language, wherein the desired print document is in Portable Document Format and the instructions are executable to cause the processor to output the desired print document.

8. A non-transitory computer-readable storage medium comprising a set of computer-readable instructions stored thereon, which, when executed by a processing system, cause the processing system to:
receive a web document having a plurality of attributes, wherein the plurality of attributes comprises at least one of a font size and a line spacing;
generate a scaled web document by causing the processing system to:
determine an attribute of a subset of characters of a first element, and
scale up the attribute of the subset by multiplying the attribute by a scaling factor that is greater than 1;
determine an onscreen position of objects of the scaled web document by causing the processing system to:
wrap the subset of characters of the first element of the scaled web document in a second element; and
determine an onscreen position of the subset based on the wrapping;
determine a position of the subset on a scaled print document for each of the objects of the scaled web document based on the scaling up of the attribute of the subset, and render a text of the objects to be printed in an buffer;
generate a position on a desired print document for each of the objects of the scaled print document by scaling down each of the objects of the scaled print document in the buffer by the scaling factor; and
format the desired print document for one of saving as a print document file and sending to a physical printer.

9. The non-transitory computer-readable storage medium of claim 8, wherein the instructions cause the processing system to determine the position of the subset on the scaled print document based on the scaling down of the attribute of the subset.

* * * * *